C. A. TOWER.
FRICTION DRAFT RIGGING.
APPLICATION FILED FEB. 1, 1909.
962,993.
Patented June 28, 1910.
2 SHEETS—SHEET 1.
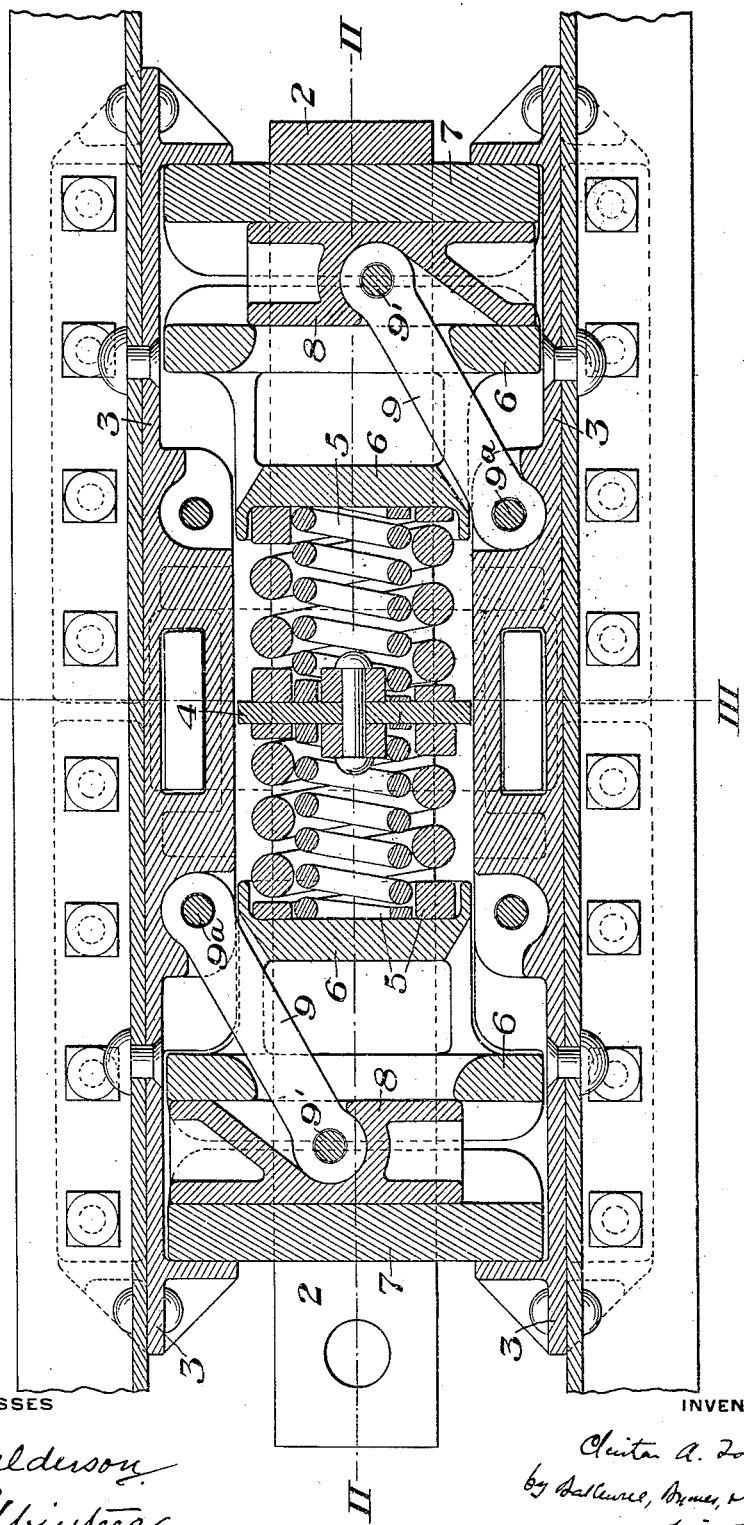
WITNESSES
INVENTOR C. A. TOWER.
FRICTION DRAFT RIGGING.
APPLICATION FILED FEB. 1, 1909.
962,993.
Patented June 28, 1910.
2 SHEETS—SHEET 2.
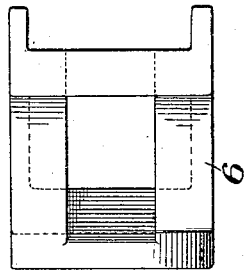
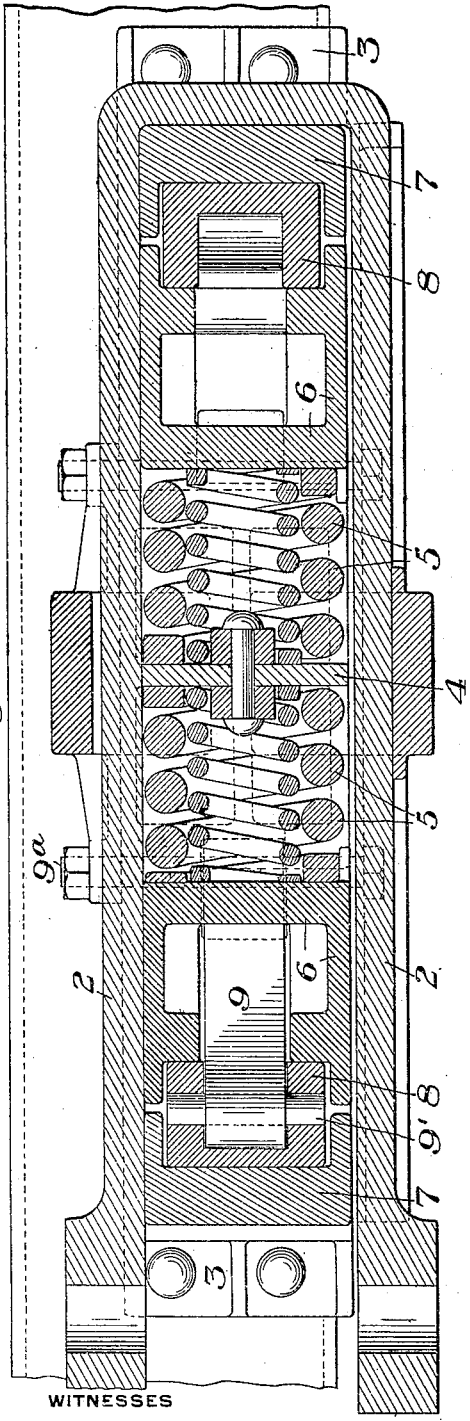
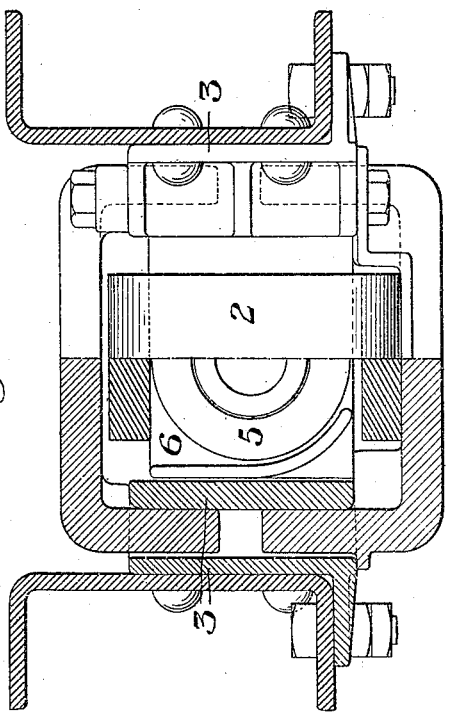
WITNESSES
INVENTOR

UNITED STATES PATENT OFFICE.

CLINTON A. TOWER, OF CLEVELAND, OHIO, ASSIGNOR TO THE NATIONAL MALLEABLE CASTINGS COMPANY, OF CLEVELAND, OHIO, A CORPORATION OF OHIO.

FRICTION DRAFT-RIGGING.

962,993.   Specification of Letters Patent.   Patented June 28, 1910.

Application filed February 1, 1909. Serial No. 475,312.

*To all whom it may concern:*

Be it known that I, CLINTON A. TOWER, of Cleveland, Cuyahoga county, Ohio, have invented a new and useful Friction Draft-Rigging, of which the following is a full, clear, and exact description, reference being had to the accompanying drawings, forming part of this specification, in which—

Figure 1 is a horizontal longitudinal section of a draft-rigging constructed in accordance with my invention; Fig. 2 is a vertical section on the line II—II of Fig. 1; Fig. 3 is a partial vertical cross-section on the line III—III of Fig. 1; and Fig. 4 is a detail view on one of the followers.

In the drawings, 2 represents the yoke of a car coupler, 3, 3 are the draft irons, and 5, 5 are springs or pairs of springs bearing at their outer ends against followers 6, 6, which are set in guide-ways in the draft irons. The plate 4 serves as a retaining piece between the springs 5, 5, and enables me by using the two springs of ordinary length to get the same effect as from a single special spring of double length. My invention, however, is not limited to the use of two springs with the intermediate plate. On the outer sides of the followers 6, 6 are followers 7, 7, and between the members of each pair 6, 7 is a transversely movable friction plate or element 8, which has surfaces bearing against the friction surfaces of the followers 6 and 7.

The friction plates 8 are connected by diagonal links 9 to the draft irons, these links being pivoted at their ends preferably by pins 9', 9ª and extending inwardly in opposite directions from the friction plates 8 to the draft irons through slots in the followers 6, so that when stress is exerted upon them they will be in compression and not in tension.

In the operation of the device, in pulling, the forward motion of the coupler is transmitted by the yoke to the follower 7, and thence to the friction plate 8 and follower 6 at the rear of the friction device, thus compressing the spring 5, and by moving the friction plate 8 forwardly causing the link 9 to act as a toggle and to move the friction plate in a direction away from the pivot 9ª of the link between the friction surfaces of the parts 6 and 7, which being held in strong frictional contact therewith exert a clamping action and oppose the desired frictional resistance. The link being in compression during this operation is able to resist the force applied to it and undue stress is not put upon the pins by which the link is pivoted at the ends. During buffing, the action is exerted upon the forward part of the draft rigging, the follower 7 at the forward end against which the coupler bears being pushed backwardly, thus moving back the forward friction plate 8 and the follower 6 against its spring 5, and by the motion of the pivot 9' of the link 9 causing the plate 8 to move between the surfaces 6 and 7 against which it is held by strong frictional action, as above described.

The device is self-releasing, and is very efficient in its action.

The parts may be modified in many ways in shape and arrangement by those skilled in the art, since

What I claim is:—

1. A draft rigging having a laterally movable friction plate, surfaces between which it is frictionally clamped, said surfaces extending transversely to the line of the draft rigging, and a connecting piece extending diagonally from said friction plate to a stationary portion of the draft rigging and being under compression when stress is applied to the draft rigging.

2. A draft-rigging having a friction plate, a spring, followers between which the friction plate is set, and a link connected with the friction plate, said plate extending transversely to the line of the draft-rigging, and the link extending inwardly from the friction plate and being under compression when stress is applied thereto.

3. A draft-rigging having a laterally movable friction plate, a surface against which it is pressed, and a link on the inner side of the friction plate adapted to receive compression during motion of the parts.

4. A draft rigging having a laterally movable friction plate, surfaces between which it is frictionally clamped, said surfaces extending transversely to the line of the draft rigging, and a connecting piece extending diagonally from said friction plate to a stationary portion of the draft rigging and being under compression when stress is applied to the draft rigging, said connecting piece being pivotally mounted at its ends.

5. A friction draft rigging having a laterally movable friction plate and surfaces between which it is frictionally clamped, said surfaces extending transversely to the line of the draft rigging, a case within which the draft rigging is inclosed, a diagonal link extending inwardly from the friction plate to the case and being under compression when stress is applied thereto.

In testimony whereof, I have hereunto set my hand.

CLINTON A. TOWER.

Witnesses:
　HARRY E. ORR,
　CHESTER K. BROOKS.